United States Patent
Xiao et al.

(10) Patent No.: US 11,995,451 B2
(45) Date of Patent: May 28, 2024

(54) RESOURCE PERMISSION PROCESSING METHOD AND APPARATUS, STORAGE MEDIUM, AND CHIP

(71) Applicant: HUAWEI TECHNOLOGIES CO., LTD., Guangdong (CN)

(72) Inventors: Fuzhou Xiao, Beijing (CN); Youzhan Yin, Beijing (CN); Li Chen, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 836 days.

(21) Appl. No.: 17/041,942

(22) PCT Filed: Mar. 27, 2018

(86) PCT No.: PCT/CN2018/080712
§ 371 (c)(1),
(2) Date: Sep. 25, 2020

(87) PCT Pub. No.: WO2019/183806
PCT Pub. Date: Oct. 3, 2019

(65) Prior Publication Data
US 2021/0081217 A1 Mar. 18, 2021

(51) Int. Cl.
*G06F 9/44* (2018.01)
*G06F 8/71* (2018.01)
(Continued)

(52) U.S. Cl.
CPC ........... *G06F 9/44505* (2013.01); *G06F 8/71* (2013.01); *G06F 9/5061* (2013.01); *G06F 16/90344* (2019.01)

(58) Field of Classification Search
CPC .................................................. G06F 9/4405
See application file for complete search history.

(56) References Cited

U.S. PATENT DOCUMENTS

| 6,381,742 | B2 | 4/2002 | Forbes et al. | |
|---|---|---|---|---|
| 7,805,469 | B1 * | 9/2010 | Nagaralu | G06F 16/119 |
| | | | | 707/822 |

(Continued)

FOREIGN PATENT DOCUMENTS

| CN | 101697133 A | 4/2010 |
|---|---|---|
| CN | 102446258 A | 5/2012 |

(Continued)

*Primary Examiner* — Phil K Nguyen
(74) *Attorney, Agent, or Firm* — WOMBLE BOND DICKINSON (US) LLP (57) ABSTRACT

A resource permission processing method and apparatus, a storage medium, and a chip are disclosed, to update a resource label in a terminal device based on a first resource permission configuration file when a system software version in the terminal device is upgraded. The first resource permission configuration file covers only path information in which a label changes before and after the system software version is upgraded. Therefore, in a process of updating the resource label stored in the terminal device, a matching amount is greatly reduced when path information that matches traversal path information of a resource is searched for in the first resource permission configuration file, and therefore time consumed for labeling the stored resource can be reduced. The reduced time for labeling the stored resource improves labeling efficiency, reduces time consumed for the system software version upgrade, and improves efficiency of the system software version upgrade.

20 Claims, 6 Drawing Sheets

(51) Int. Cl.
*G06F 9/445* (2018.01)
*G06F 9/50* (2006.01)
*G06F 16/903* (2019.01)

(56) References Cited

U.S. PATENT DOCUMENTS

| | | | |
|---|---|---|---|
| 9,032,386 B1 | 5/2015 | Vaynshteyn et al. | |
| 9,804,933 B2 * | 10/2017 | Wei | G06F 11/0793 |
| 11,074,062 B1 * | 7/2021 | Hosic | G06F 8/65 |
| 2001/0029605 A1 | 10/2001 | Forbes et al. | |
| 2004/0003266 A1 * | 1/2004 | Moshir | G06F 8/62 |
| | | | 717/174 |
| 2004/0078726 A1 * | 4/2004 | Little | G06N 5/025 |
| | | | 714/48 |
| 2008/0222117 A1 * | 9/2008 | Broder | G06F 16/334 |
| 2012/0191683 A1 * | 7/2012 | Tanaka | G06F 16/13 |
| | | | 707/705 |
| 2013/0332916 A1 | 12/2013 | Chinn et al. | |
| 2014/0053145 A1 | 2/2014 | Steigleder | |
| 2016/0299835 A1 * | 10/2016 | Jain | G06F 11/3676 |
| 2017/0052776 A1 * | 2/2017 | Kotian | G06F 21/12 |
| 2018/0067736 A1 * | 3/2018 | De Zaeytijd | G06F 8/65 |
| 2019/0138376 A1 * | 5/2019 | Christy Jesuraj | G06F 9/54 |

FOREIGN PATENT DOCUMENTS

| | | |
|---|---|---|
| CN | 104133699 A | 11/2014 |
| CN | 104284297 A | 1/2015 |
| CN | 105654353 A | 6/2016 |
| CN | 105786538 A | 7/2016 |
| EP | 1548586 A2 | 6/2005 |
| EP | 2482187 A1 | 8/2012 |
| WO | 2016206502 A1 | 12/2016 |

* cited by examiner

RESOURCE PERMISSION PROCESSING METHOD AND APPARATUS, STORAGE MEDIUM, AND CHIP

CROSS-REFERENCE TO RELATED APPLICATIONS

This application is a National Stage of International Application No. PCT/CN2018/080712, filed on Mar. 27, 2018, which is herein incorporated by reference in its entirety.

TECHNICAL FIELD

Embodiments of this application relate to communications technologies, and in particular, to a resource permission processing method and apparatus, a storage medium, and a chip.

BACKGROUND

An increasingly capacity of a storage component of a terminal device and widely used clone software and the like result in more resources stored in the terminal device, for example, a photo, an address book, and music. Attribute information of the resource in the terminal device includes a resource label, used to label access permission on the resource, in other words, which process or which service of the terminal device has the access permission on the resource.

Currently, a system software version upgrade package of the terminal device carries a resource permission configuration file corresponding to a new system software version. The resource permission configuration file includes file path information, a label corresponding to each file, and a label corresponding to each piece of path information. The resource permission configuration file covers path information of all resources. When a system software version in the terminal device is upgraded, each time a resource is traversed in the storage component, the terminal device searches the resource permission configuration file for path information that matches path information of the resource. Then, the terminal device may compare a label corresponding to the matched path information with a current label (namely, a label before the upgrade) of the resource. When it is determined that the two labels are different, the terminal device labels the resource corresponding to the matched path information, to update the access permission on the resource.

However, during the system software version is upgraded, when the foregoing manner is used to label a resource in the terminal device, comparatively long time is required for the labeling, and consequently labeling efficiency is comparatively low, time consumed for the version upgrade is long, and user experience is comparatively poor.

SUMMARY

Embodiments of this application provide a resource permission processing method and apparatus, a storage medium, and a chip, to resolve a technical problem that when a system software version in a terminal device is upgraded, efficiency of labeling a resource is comparatively low, and consequently time consumed for the system software version upgrade is long, and user experience is comparatively poor.

According to a first aspect, an embodiment of this application provides a resource permission processing method. The method may be applicable to a terminal device, or may be applicable to a chip in a terminal device. The following describes the method by using an example in which the method is applicable to the terminal device, where the method includes:

when a system software version in the terminal device is upgraded, obtaining a first resource permission configuration file, where the first resource permission configuration file includes at least one piece of first path information and a label corresponding to each piece of the first path information in a second resource permission configuration file, the second resource permission configuration file is a resource permission configuration file corresponding to a new system software version, a third resource permission configuration file is a resource permission configuration file corresponding to an earlier system software version, and the first path information is path information, same as path information that is corresponding to different labels and that is in the second resource permission configuration file and the third resource permission configuration file; and updating a resource label in the terminal device based on the first resource permission configuration file.

According to the resource permission processing method provided in the first aspect, the first resource permission configuration file covers only the path information in which a label changes before and after the system software version is upgraded, and the label corresponding to the path information. Therefore, when the terminal device updates the resource label stored in the terminal device, a matching amount is reduced when the terminal device searches the first resource permission configuration file for path information that matches traversal path information of a resource, time consumed for labeling the stored resource can be reduced. This further improves labeling efficiency, reduces time consumed for the system software version upgrade, and improves efficiency of the system software version upgrade.

In an embodiment, before the obtaining a first resource permission configuration file, the method further includes:

obtaining the second resource permission configuration file and the third resource permission configuration file;

comparing a label corresponding to each piece of path information in the second resource permission configuration file with a label corresponding to each piece of the path information in the third resource permission configuration file, and using path information with different labels as the first path information;

generating the first resource permission configuration file based on each piece of the first path information and a label corresponding to each piece of the first path information in the second resource permission configuration file; and storing the first resource permission configuration file.

According to the resource permission processing method provided in the embodiment, the obtained second resource permission configuration file is compared with the obtained third resource permission configuration file to obtain the path information with the different labels in the two resource permission configuration files, and then based on the path information and the labels, the first resource permission configuration file is generated, where the first resource permission configuration file covers only the path information in which a label changes before and after the system software version is upgraded. Therefore, when the terminal device updates, based on the first resource permission configuration file, the resource label stored in the terminal device, the matching amount is reduced when the terminal device searches the first resource permission configuration file for the path information that matches the traversal path information of the resource, the time consumed for labeling the stored resource can be reduced. This further improves the labeling efficiency, reduces the time consumed for the system software version upgrade, and improves the efficiency of the system software version upgrade.

In an embodiment, before the storing the first resource permission configuration file, the method further includes:
  encrypting and signing the first resource permission configuration file.

According to the resource permission processing method provided in the embodiment, the first resource permission configuration file is encrypted and signed before the first resource permission configuration file is stored, to prevent unauthorized software or a hacker from maliciously changing content in the first resource permission configuration file, and ensure security during the system software version in the terminal device is upgraded. This improves user experience.

In an embodiment, the obtaining the second resource permission configuration file and the third resource permission configuration file includes:
  before a system software version upgrade package is parsed, obtaining the third resource permission configuration file stored in the terminal device; and
  when the system software version upgrade package is parsed, obtaining the second resource permission configuration file carried in the system software version upgrade package.

In an embodiment, the updating a resource label in the terminal device based on the first resource permission configuration file includes:
  when the first path information includes a regular expression character, updating all resource labels in an upper-level path of the first path based on the label corresponding to the first path information in the second resource permission configuration file.

According to the resource permission processing method provided in the embodiment, when the first resource permission configuration file includes the regular expression character, the terminal device may no longer perform a traversal operation on all the resources in the upper-level path of the first path, but perform a path matching operation and a label comparison operation on each resource in the upper-level path of the first path, and when a resource whose path is matched but labels are different, the terminal device further updates the resource label by using the label corresponding to the first path information. This further improves the efficiency of labeling the resource.

In an embodiment, the updating a resource label in the terminal device based on the first resource permission configuration file includes:
  when the first path information includes a regular expression character string in a preset format, updating all resource labels in the first path based on the label corresponding to the first path information in the second resource permission configuration file.

According to the resource permission processing method provided in the embodiment, the regular expression character string in the preset format is preset, so that the terminal device may no longer perform the traversal operation and the path matching operation on all the resources in the first path included with the regular expression character string in the preset format, but perform the label comparison operation on each resource in the first path, and when a resource whose labels are different, the terminal device further updates the resource label by using the label corresponding to the first path information. This further improves the efficiency of labeling the resource.

In an embodiment, the method further includes:
  if the first resource permission configuration file fails to be obtained, updating the resource label in the terminal device based on the second resource permission configuration file.

According to the resource permission processing method provided in the embodiment, when the terminal device fails to obtain the first resource permission configuration file, the terminal device may further update, based on the second resource permission configuration file, the resource label in the terminal device in an existing manner of updating a resource label, to provide a backup solution to update the resource label, and ensure reliability of updating the resource label. This further improves reliability of the system software version upgrade.

In an embodiment, the method further includes:
  if duration for updating the resource label in the terminal device exceeds preset duration, restarting the terminal device, and re-obtaining the first resource permission configuration file.

According to the resource permission processing method provided in the embodiment, when the duration for updating the resource label in the terminal device exceeds the preset duration, the terminal device may restart the terminal device, re-obtain the first resource permission configuration file, and re-label the resource, to ensure the reliability of updating the resource label. This further improves the reliability of system software version upgrade.

In an embodiment, an operating system of the terminal device is a Linux operating system, and the method further includes:
  after an operation of updating the resource label in the terminal device is completed, updating, by using a hash value corresponding to the second resource permission configuration file, a hash value corresponding to a currently used resource permission configuration file stored in the terminal device.

According to the resource permission processing method provided in the embodiment, after the terminal device installed with the Linux operating system updates the resource label stored in the terminal device, the hash value corresponding to the currently used resource permission configuration file stored in the terminal device may be further updated by using the hash value corresponding to the second resource permission configuration file. In other words, the hash value corresponding to the third resource permission configuration file stored in the terminal device is replaced to ensure accuracy of the hash value that is stored in the terminal device and that is used to represent the currently used resource permission configuration file.

According to a second aspect, an embodiment of this application provides a resource permission processing apparatus, where the apparatus includes:
  a first obtaining module, configured to: when a system software version in a terminal device is upgraded, obtain a first resource permission configuration file, where the first resource permission configuration file includes at least one piece of first path information and a label corresponding to each piece of the first path information in a second resource permission configuration file, the second resource permission configuration file is a resource permission configuration file corresponding to a new system software version, a third resource permission configuration file is a resource permission configuration file corresponding to an earlier system software version, and the first path information is path information, same as path information that is corresponding to different labels and that is in the second resource permission configuration file and the third resource permission configuration file; and an update module, configured to update a resource label in the terminal device based on the first resource permission configuration file.

In an embodiment, the apparatus further includes:

a second obtaining module, configured to: before the first obtaining module obtains the first resource permission configuration file, obtain the second resource permission configuration file and the third resource permission configuration file;

a processing module, configured to: compare a label corresponding to each piece of path information in the second resource permission configuration file with a label corresponding to each piece of the path information in the third resource permission configuration file, use path information with different labels as the first path information, and generate the first resource permission configuration file based on each piece of the first path information and a label corresponding to each piece of the first path information in the second resource permission configuration file; and a storage module, configured to store the first resource permission configuration file.

In an embodiment, the processing module is further configured to encrypt and sign the first resource permission configuration file before the storage module stores the first resource permission configuration file.

In an embodiment, the second obtaining module is configured to: before a system software version upgrade package is parsed, obtain the third resource permission configuration file stored in the terminal device; and when the system software version upgrade package is parsed, obtain the second resource permission configuration file carried in the system software version upgrade package.

In an embodiment, the update module is configured to: when the first path information includes a regular expression character, update all resource labels in an upper-level path of the first path based on the label corresponding to the first path information in the second resource permission configuration file.

In an embodiment, the update module is configured to: when the first path information includes a regular expression character string in a preset format, update all resource labels in the first path based on the label corresponding to the first path information in the second resource permission configuration file.

In an embodiment, the update module is further configured to: when the first obtaining module fails to obtain the first resource permission configuration file, update the resource label in the terminal device based on the second resource permission configuration file.

In an embodiment, the apparatus further includes:

a restart module, configured to restart the terminal device when duration in which the update module updates the resource label in the terminal device exceeds preset duration, where the first obtaining module is further configured to re-obtain the first resource permission configuration file.

In an embodiment, an operating system of the terminal device is a Linux operating system, and the update module is further configured to: after an operation of updating the resource label in the terminal device is completed, update, by using a hash value corresponding to the second resource permission configuration file, a hash value corresponding to a currently used resource permission configuration file stored in the terminal device.

For beneficial effects of the resource permission processing apparatus provided in the second aspect and the embodiments of the second aspect, refer to the beneficial effects brought by the first aspect and the embodiments of the first aspect. Details are not described herein again.

According to a third aspect, an embodiment of this application provides a resource permission processing apparatus, where the apparatus includes a processor and a memory.

The memory is configured to store computer-executable program code, where the program code includes an instruction, and when the processor executes the instruction, the instruction enables the resource permission processing apparatus to perform the method according to the first aspect and the embodiments of the first aspect.

According to a fourth aspect, an embodiment of this application provides a computer-readable storage medium, where the computer-readable storage medium stores a computer program, and when the computer program is executed by a processor, the method according to the first aspect and the embodiments of the first aspect is performed.

According to a fifth aspect, an embodiment of this application provides a chip, where the chip stores a computer program, and when the computer program is executed by a processor, the method according to the first aspect and the embodiments of the first aspect is performed.

According to the resource permission processing method and apparatus, the storage medium, and the chip provided in the embodiments of this application, the first resource permission configuration file covers only the path information in which the label changes before and after the system software version is upgraded, and the label corresponding to the path information. Therefore, when the resource label stored in the terminal device is updated, the matching amount is reduced when the path information that matches the traversal path information of the resource is searched for in the first resource permission configuration file, the time consumed for labeling the stored resource can be reduced. This further improves the labeling efficiency, reduces the time consumed for the system software version upgrade, and improves the efficiency of the system software version upgrade.

DESCRIPTION OF EMBODIMENTS

A terminal device in the embodiments of this application may also be referred to as a terminal, user equipment (UE), a mobile station (MS), a mobile terminal (MT), or the like. The terminal device may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in a remote surgery, a wireless terminal in a smart grid, a wireless terminal in transportation safety, a wireless terminal in a smart city, a wireless terminal in a smart home, or the like.

In the prior art, an increasingly large capacity of a storage component (for example, an embedded multimedia card (EMMC), a unix file system (UFS) of the terminal device and widely used clone software and the like result in more and more resources stored in the terminal device, for example, a photo, a contact, and music. Attribute information of the resource in the terminal device includes a resource label, used to label access permission on the resource, in other words, which process or which service of the terminal device has the access permission on the resource.

Currently, a system software version upgrade in the terminal device includes the following several scenarios: an upgrade scenario in which the terminal device downloads a system software version upgrade package by using an over the air (OTA) technology, an upgrade scenario in which the terminal device loads a system software version upgrade package stored in a secure digital memory card (SD) for an upgrade, or an upgrade scenario in which the terminal device upgrades, by using a new system software version installed in one partition (for example, a partition A), an earlier system software version in another partition (for example, a partition B). The partition may be logical division into the storage component of the terminal device.

In the upgrade scenario in which the terminal device downloads the system software version upgrade package by using the OTA technology and the upgrade scenario in which the terminal device loads the system software version upgrade package stored in the SD card for the upgrade, the system software version upgrade in the terminal device may include two phases: One is a recovery phase, and the other is an init phase. In the recovery phase, the terminal device may upgrade the system software version based on the system software version upgrade package, and restart the terminal device. The init phase is a phase entered after the terminal device is restarted. In the init phase, if a label corresponding to at least one piece of path information existed in a resource permission configuration file that is corresponding to a new system software version and that is carried in the system software upgrade package is different from a label corresponding to the path information in a resource permission configuration file corresponding to an earlier system software version (namely, a system software version before the upgrade), the terminal device may label a resource based on the resource permission configuration file corresponding to the new system software version, to update the access permission on the stored resource.

In the upgrade scenario in which the terminal device upgrades, by using the new system software version installed in the partition (for example, the partition A), the earlier system software version in the another partition (for example, the partition B), the earlier system software version in another partition (for example, the partition B), the system software version upgrade in the terminal device may include one phase: an init phase. In the init phase, if a label corresponding to at least one piece of path information existed in a resource permission configuration file corresponding to a new system software version is different from a label corresponding to the path information in a resource permission configuration file corresponding to an earlier system software version (namely, a system software version before the upgrade), the terminal device may label a resource based on the resource permission configuration file corresponding to the new system software version, to update the access permission on the stored resource.

A Linux operating system is used as an example, a resource permission configuration file corresponds to a hash value, and the hash value is generated based on content of the resource permission configuration file. Therefore, the terminal device may compare a hash value corresponding to the resource permission configuration file corresponding to the new system software version with a hash value corresponding to the resource permission configuration file corresponding to the earlier system software version. When determining that the two hash values are different, the terminal device may determine that a label corresponding to at least one piece of path information existed in the resource permission configuration file corresponding to the new system software version is different from a label corresponding to the path information in the resource permission configuration file corresponding to the earlier system software version. In this scenario, the terminal device triggers an all-labeling operation.

The resource permission configuration file includes a file, path information, a label corresponding to each file, and a label corresponding to each piece of path information. In the prior art, regardless of whether the label corresponding to the resource changes before and after the system software version is upgraded, the resource permission configuration file corresponding to the new system software version still carries the path information of the resource and the label corresponding to the path information. In other words, the path information included in the resource permission configuration file may cover path information of all resources in the terminal device. The path information may be a path of a resource, or may be path information corresponding to a plurality of resources.

For example, it is assumed that the terminal device stores a resource 1, a resource 2, and a resource 3, and path information of the resource 1 is /data/media/1.apk, path information of the resource 2 is /data/media/1.jpg, and path information of the resource 3 is /data/media/2.jpg. The resource permission configuration file includes labels corresponding to path information /data/media/1(/.*)? and a label corresponding to /data/media/2.jpg. In this scenario, the path information /data/media/1(/.*)? may correspond to the resource 1 and the resource 2, and the labels corresponding to the path information /data/media/1(/.*)? are used to represent a label corresponding to the resource 1 and a label corresponding to the resource 2 after the system software version is upgraded. The path information /data/media/2.jpg corresponds to the resource 3, and the label corresponding to the path information /data/media/2.jpg is used to represent a label corresponding to the resource 3 after the system software version is upgraded.

When the terminal device determines, in the init phase, that the label corresponding to the at least one piece of path information existed in the resource permission configuration file corresponding to the new system software version is different from the label corresponding to the path information in the resource permission configuration file corresponding to the earlier system software version, the terminal device triggers the all-labeling operation. The terminal device traverses, in a recursive manner, the resources stored in the storage component one by one. Each time a resource is traversed, the terminal device reads path information of the resource, and searches the resource permission configuration file corresponding to the new system software version for path information that matches the path information of the resource. Then, the terminal device may compare a label corresponding to the matched path information with the current label (namely, a label before the upgrade, or referred to as a label corresponding to the earlier system software version) of the resource. When it is determined that the two labels are different, it indicates that the access permission on the resource is adjusted in this version upgrade. Therefore, the terminal device may label the resource corresponding to the matched path information, to update the access permission on the resource.

In other words, regardless of whether the resource label changes before and after the system software version is upgraded, the terminal device needs to match, in the resource permission configuration file, the path information corresponding to the resource, and compare the label corresponding to the matched path information with the current label (namely, the label before the upgrade) of the resource. More and more resources are stored in the terminal device (for example, over hundreds of thousands of and even millions of resources stored in the terminal device). When the foregoing manner is used for labeling in the terminal device, comparatively long time is required for labeling the stored resource, and consequently, labeling efficiency is comparatively low, time consumed for the system software version upgrade is long, and user experience is comparatively poor.

In consideration of the foregoing case, the embodiments of this application provide a resource permission processing method, to resolve a prior-art technical problem that when the system software version in the terminal device is upgraded, efficiency of labeling the resource is comparatively low, and consequently time consumed for the system software version upgrade is long, and user experience is comparatively poor. The method in the embodiments of this application may be applicable to the upgrade scenario in which the terminal device downloads the system software version upgrade package by using the OTA technology, may be applicable to the upgrade scenario in which the terminal device loads the system software version upgrade package stored in the SD card for the upgrade, or may be applicable to the upgrade scenario in which the terminal device upgrades, by using the new system software version installed in the partition (for example, the partition A), the earlier system software version in the another partition (for example, the partition B). A person skilled in the art may understand that the upgrade scenario does not constitute a scenario to which the embodiments of this application are applicable. The embodiments of this application may include but are not limited to the upgrade scenario, and provided that any upgrade scenario in which a resource is labeled in the foregoing manner, the method in the embodiments of this application may be used.

The method in the embodiments of this application may be performed by a terminal device, or may be performed by a chip in a terminal device. The following describes the technical solutions of this application in detail by using an example in which the method is performed by the terminal device and a specific embodiment. The following several specific embodiments may be combined with each other, and a same or similar concept or process may not be described again in some embodiments.

For ease of understanding of the embodiments of this application, a second resource permission configuration file and a third resource permission configuration file are defined and described below. Details are as follows:

The second resource permission configuration file is a resource permission configuration file corresponding to a new system software version. For example, the second resource permission configuration file is a resource permission configuration file carried in the system software version upgrade package downloaded by the terminal device by using the OTA technology, a resource permission configuration file carried in the system software version upgrade package recorded by the terminal device by using the SD card, or a resource permission configuration file used by the new system software version installed in the partition (for example, the partition A) in the terminal device.

The third resource permission configuration file is a resource permission configuration file corresponding to an earlier system software version. To be specific, the third resource permission configuration file is a resource permission configuration file corresponding to a system software version being used on the terminal device before the system software version is upgraded.

A first resource permission configuration file includes at least one piece of first path information and a label corresponding to at least one piece of first path information in the second resource permission configuration file. The first path information is path information, same as path information that is corresponding to different labels and that is in the second resource permission configuration file and the third resource permission configuration file. In other words, the path information included in the first resource permission configuration file is the path information that is corresponding to different labels and that is in the second resource permission configuration file and the third resource permission configuration file. Therefore, in some scenarios, the first resource permission configuration file may also be referred to as a differential resource permission configuration file.

Figure 1:
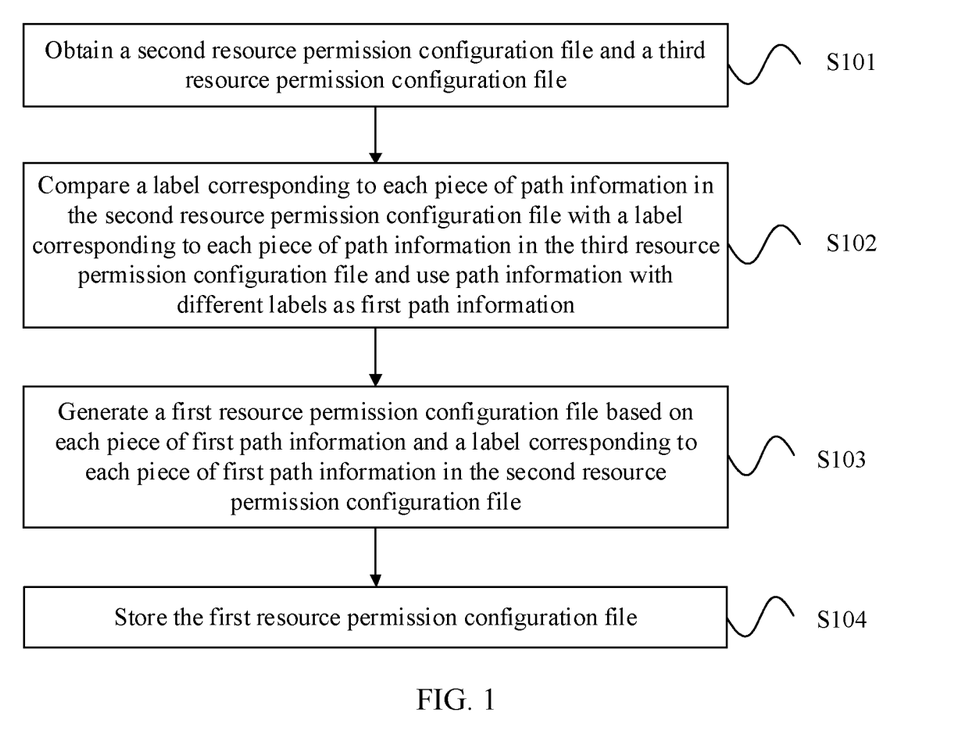
FIG. 1 is a schematic flowchart 1 of a resource permission processing method according to an embodiment of this application.

The following describes in detail how the terminal device generates the first resource permission configuration file based on the second resource permission configuration file and the third resource permission configuration file. FIG. 1 is a schematic flowchart of a resource permission processing method according to an embodiment of this application. As shown in FIG. 1, the method may include:

S101: Obtain a second resource permission configuration file and a third resource permission configuration file.

S102: Compare a label corresponding to each piece of path information in the second resource permission configuration file with a label corresponding to each piece of path information in the third resource permission configuration file and use path information with different labels as first path information.

S103: Generate a first resource permission configuration file based on each piece of first path information and a label corresponding to each piece of first path information in the second resource permission configuration file.

S104: Store the first resource permission configuration file.

For example, in an upgrade scenario in which a terminal device downloads a system software version upgrade package by using an OTA technology, and in an upgrade scenario in which the terminal device loads a system software version upgrade package stored in an SD card for an upgrade, in a recovery phase, before parsing the system software version upgrade package, the terminal device may obtain from currently used system software in the terminal device, the stored third resource permission configuration file. Correspondingly, when parsing the system software version upgrade package, the terminal device may obtain the second resource permission configuration file from the system software version upgrade package.

In an upgrade scenario in which the terminal device upgrades, by using a new system software version installed in a partition (for example, a partition A), an earlier system software version in another partition (for example, a partition B), before entering an inti phase, the terminal device may obtain the stored third resource permission configuration file from the another partition. Correspondingly, the terminal device may obtain the second resource permission configuration file from the new system software version in the partition.

After obtaining the second resource permission configuration file and the third resource permission configuration file, the terminal device may compare the label corresponding to each piece of path information in the second resource permission configuration file with the label corresponding to each piece of path information in the third resource permission configuration file, and use the path information with the different labels as the first path information. For example, the terminal device may match path information in the two resource permission configuration files. When the two pieces of path information are the same, the terminal device compares labels corresponding to the two pieces of path information. When the two pieces of path information correspond to different labels, the terminal device may use the path information as the first path information. Repeat the operations until all labels corresponding to all path information are compared.

Then, the terminal device may generate the first resource permission configuration file based on each piece of first path information and the label corresponding to each piece of first path information in the second resource permission configuration file. In this case, the first resource permission configuration file includes each piece of first path information and the label corresponding to each piece of first path information in the second resource permission configuration file. In other words, the first resource permission configuration file includes path information that is corresponding to different labels and that is in the second resource permission configuration file and the third resource permission configuration file, and the label corresponding to the path information.

After generating the first resource permission configuration file, the terminal device may store the first resource permission configuration file based on preset path information in the first resource permission configuration file. To be specific, the first resource permission configuration file is stored in a non-volatile storage component of the terminal device, to avoid a loss of the first resource permission configuration file when the terminal device enters the init phase due to restart. Optionally, in some embodiments, the terminal device may further encrypt and sign the first resource permission configuration file before storing the first resource permission configuration file, to prevent unauthorized software or a hacker from maliciously changing content of the first resource permission configuration file, and ensure security during the system software version in the terminal device is upgraded. This improves user experience.

Figure 2:
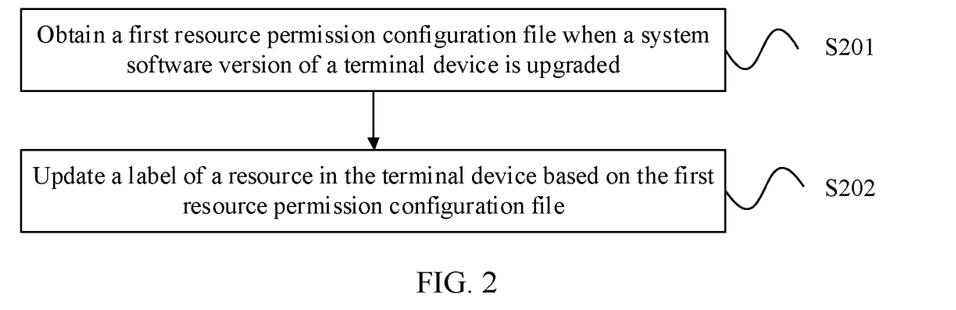
FIG. 2 is a schematic flowchart of another resource permission processing method according to an embodiment of this application.

The following describes in detail how the terminal device in the init phase updates, based on the first resource permission configuration file, a label of a stored resource. FIG. 2 is a schematic flowchart of another resource permission processing method according to an embodiment of this application. As shown in FIG. 2, the method may include:

S201: Obtain a first resource permission configuration file when a system software version of a terminal device is upgraded.

S202: Update a resource label in the terminal device based on the first resource permission configuration file.

After entering an init phase, the terminal device may obtain the first resource permission configuration file based on preset path information in the first resource permission configuration file. Then, the terminal device may update the resource label in the terminal device based on the first resource permission configuration file. For example, the terminal device traverses, in a recursive manner, the resources stored in a storage component one by one. Each time a resource is traversed, the terminal device reads path information of the resource, and searches the first resource permission configuration file for path information that matches the path information of the resource. Then, the terminal device may compare a label corresponding to the matched path information with a current label (namely, a label before the upgrade, or referred to as a label corresponding to an earlier system software version) of the resource. When it is determined that the two labels are different, it indicates that access permission on the resource is adjusted in this version upgrade. Therefore, the terminal device may label the resource corresponding to the matched path information, to update the access permission on the resource.

Path information included in the first resource permission configuration file is only path information in which a label changes, and does not cover path information of all resources. Therefore, a matching amount is reduced when the terminal device searches the first resource permission configuration file for the path information that matches the path information of the traversal resource. In this way, time consumed to label the stored resource can be reduced. Therefore, efficiency of labeling the resource can be improved, time consumed for the system version upgrade is reduced, and efficiency of system version upgrade is improved.

Optionally, in some embodiments, in a process in which the terminal device updates the resource label in the terminal device based on the first resource permission configuration file, when first path information includes a regular expression character, the terminal device updates all resource labels in an upper-level path of the first path based on a label corresponding to the first path information in the second resource permission configuration file. The regular expression character may be, for example, a combination of one or more characters of ".", "^", "$", "?", "*", "+", "|", "[", "(", and "{". In other words, when the first resource permission configuration file includes the regular expression character, the terminal device may no longer perform a traversal operation on all the resources in the upper-level path of the first path, but perform a path matching operation and a label comparison operation on each resource in the upper-level path of the first path, and when a resource whose path is matched but labels are different, the terminal device further updates the resource label by using the label corresponding to the first path information. There is no need to perform the traversal operation on the resource in the upper-level path of the first path. This further improves the efficiency of labeling the resource.

For example, the first path information is /data/media/1(^)?, and the first path information may include path information such as /data/media/11 and /data/media/1.apk. In this scenario, the terminal device may perform the path matching operation and the label comparison operation on each resource in data/media, and when a resource whose path is matched but labels are different, the terminal device further updates the resource label by using the label corresponding to /data/media/1(^)?. There is no need to perform the traversal operation on a resource in data/media. This further improves the efficiency of labeling the resource.

In some embodiments, when the first path information includes a regular expression character string in a preset format, the terminal device may further update all resources labels in the first path based on the label corresponding to the first path information in the second resource permission configuration file. The regular expression character string in the preset format may be set according to a user requirement, for example, "." or "(/.*)?". The regular expression character string in the preset format is preset, so that the terminal device may no longer perform the traversal operation and the path matching operation on all the resources in the first path included with the regular expression character string in the preset format, but perform the label comparison operation on each resource in the first path, and when a resource whose labels are different, the terminal device further updates the resource label by using the label corresponding to the first path information. This further improves the efficiency of labeling the resource.

For example, the first path information is /data/media/1(/.*)?, and the first path information may include path information such as /data/media/1.jpg and /data/media/1.apk. In this scenario, the terminal device may compare one by one, based on a label corresponding to /data/media/1(/.*)?, whether each resource label in /data/media/1 is the same as the label, and when the labels are different, the terminal device updates the resource label by using the label corresponding to /data/media/1(/.*)?. There is no need to perform the traversal operation and the path matching operation on the resource in data/media/1. This further improves the efficiency of labeling the resource.

Optionally, in some embodiments, after the terminal device enters the init phase, and when the terminal device fails to obtain the first resource permission configuration file based on the preset path information of the first resource permission configuration file, the terminal device may further update, based on the second resource permission configuration file, the resource label in the terminal device in an existing manner of updating a resource label, to provide a backup solution to update the resource label, and ensure reliability of updating the resource label. This further improves reliability of the system software version upgrade.

Optionally, in some embodiments, if duration in which the terminal device updates the resource label in the terminal device exceeds preset duration, it indicates that an error may occur when the terminal device labels the resource. In this scenario, the terminal device may restart the terminal device, re-obtain the first resource permission configuration file, and re-label the resource, to ensure the reliability of updating the resource label. This further improves the reliability of the system software version upgrade.

Optionally, in some embodiments, after generating the first resource permission configuration file, and before storing the first resource permission configuration file, the terminal device encrypts and signs the first resource permission configuration file. In this embodiment, after the terminal device obtains the first resource permission configuration file, the terminal device further needs to decrypt the first resource permission configuration file. Details are not described herein.

Figure 3A:
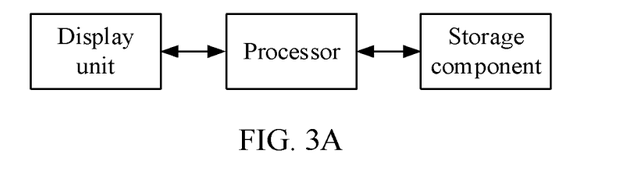
FIG. 3A is a structural block diagram of a terminal device according to an embodiment of this application.

FIG. 3A is a structural block diagram of a terminal device according to an embodiment of this application. Referring to FIG. 3A, the terminal device may include components such as a processor, a storage component, and a display unit. The following describes the components of the terminal device with reference to FIG. 3A.

In this embodiment of this application, the storage component may include a random access memory (RAM) and a non-volatile memory. The random access memory is configured to cache process data when the processor performs the foregoing resource permission processing method. The non-volatile storage device may be configured to store system software. The processor runs the system software stored in the storage component, to perform various functional applications and data processing of the terminal device. The non-volatile storage device may mainly include a system software storage partition and a data storage partition. The system software storage partition may store an operating system, system software required by at least one function (such as a sound playing function and an image playing function), or the like. The data storage partition may store a resource created based on a terminal device use, or the like. Optionally, in an upgrade scenario in which the terminal device upgrades, by using a new system software version installed in a partition (for example, a partition A), an earlier system software version in another partition (for example, a partition B), the new system software version may be, for example, installed in the data storage partition, the earlier system software version may be installed in the system software storage partition, or the non-volatile storage device of the terminal device includes at least two system software storage partitions: One partition is installed with the new system software version and another partition in the at least two system software storage partitions is installed with the earlier system software version.

Figure 3B:
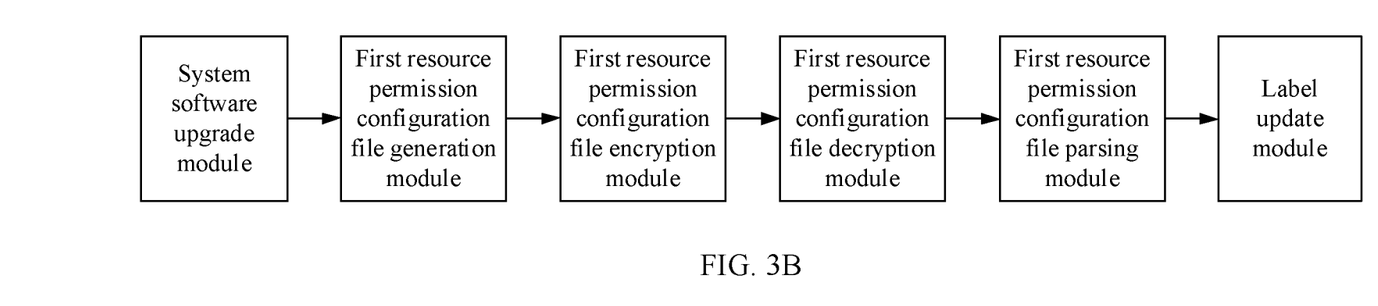
FIG. 3B is a structural block diagram of a processor of a terminal device according to an embodiment of this application.

FIG. 3B is a structural block diagram of a processor of a terminal device according to an embodiment of this application. As shown in FIG. 3B, the processor in this embodiment is configured to perform the foregoing resource permission processing method. Optionally, the processor may include one or more processing units. For example, an application processor and a modem processor may be integrated into the processor, the application processor mainly processes an operating system, a user interface, an application program, or the like, and the modem processor mainly processes radio communications. It may be understood that the modem processor may be not integrated into the processor.

In a specific implementation, the processor may include a system software upgrade module, a first resource permission configuration file generation module, a first resource permission configuration file parsing module, a label update module, and the like. Optionally, the processor may further include a first resource permission configuration file encryption module and a first resource permission configuration file decryption module.

In an upgrade scenario in which the terminal device downloads a system software version upgrade package by using an OTA technology, and an upgrade scenario in which the terminal device loads a system software version upgrade package stored in an SD card for an upgrade, the system software upgrade module, the first resource permission configuration file generation module, the first resource permission configuration file encryption module, and the like work in a recovery phase, and the first resource permission configuration file decryption module, the first resource permission configuration file parsing module, and the label update module work in an init phase. In an upgrade scenario in which the terminal device upgrades, by using a new system software version installed in a partition (for example, a partition A), an earlier system software version in another partition (for example, a partition B), the system software upgrade module, the first resource permission configuration file generation module, the first resource permission configuration file encryption module, and the like work before an init phase is entered, and the first resource permission configuration file decryption module, the first resource permission configuration file parsing module, and the label update module work in the init phase.

The system software upgrade module is configured to obtain a second resource permission configuration file based on path information in the second resource permission configuration file, and obtain a third resource permission configuration file based on path information in the third resource permission configuration file.

The first resource permission configuration file generation module is configured to convert the second resource permission configuration file into a plaintext, compare a label corresponding to each piece of path information in the second resource permission configuration file with a label corresponding to each piece of path information in the third resource permission configuration file, use path information with different labels as first path information, and generate a first resource permission configuration file based on each piece of first path information and a label corresponding to each piece of first path information in the second resource permission configuration file.

The first resource permission configuration file encryption module is configured to encrypt and sign the first resource permission configuration file, and store the first resource permission configuration file in a storage component.

The first resource permission configuration file decryption module is configured to obtain the first resource permission configuration file from the storage component, and verify and decrypt the first resource permission configuration file.

The first resource permission configuration file parsing module is configured to parse the first resource permission configuration file to determine whether the first resource permission configuration file includes first path information that includes a regular expression character.

The label update module is configured to update a resource label in the terminal device based on the first resource permission configuration file. A terminal device installed with a Linux operating system is used as an example. The label update module may be, for example, an init parsing module (or an init module). The module may invoke restorecon_recursive/data by using Init.rc, to update the resource label in the terminal device.

A display unit is configured to provide, during a system software version is upgraded, a user with information, an animation, or the like related to the system software version upgrade. For example, the display unit may display user reminder information in a process in which the terminal device labels the resource, for example, one or more pieces of information of a labeling progress, a currently being labeled resource, a resource label, or the like. The display unit may include a display panel. Optionally, the display panel may be configured in a form of a liquid crystal display (LCD), an organic light-emitting diode (OLED), or the like.

A person skilled in the art may understand that a structure of the terminal device shown in FIG. 3A does not constitute a limitation on the terminal device, and the terminal device may include more or fewer components than those shown in the figure, or combine some components, or have different component arrangements. For example, the terminal device may further include components such as a radio frequency (RF) circuit, an input unit, a wireless fidelity (WiFi) module 1170, and a power supply 1190. Details are not described herein.

Figure 4A:
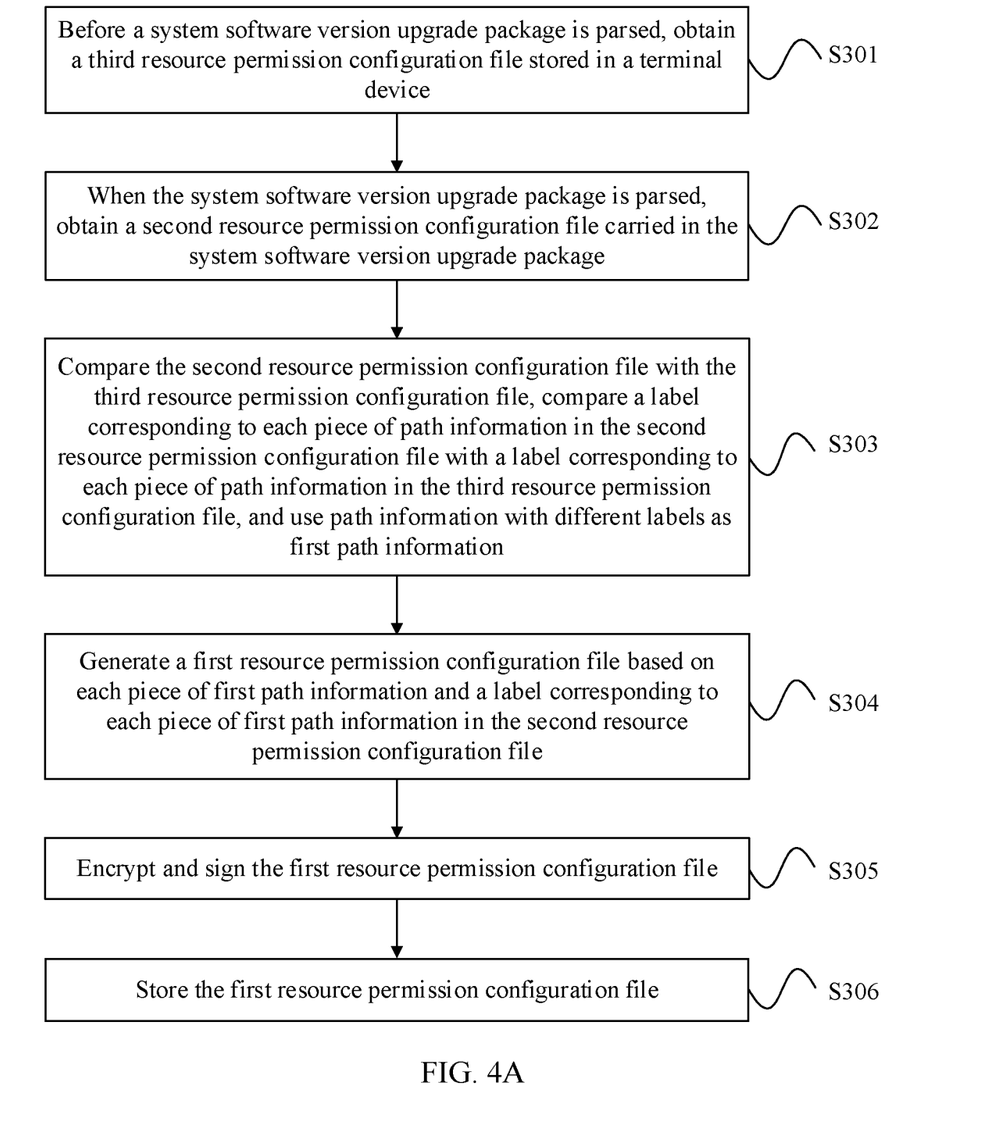
FIG. 4A is a schematic flowchart of a still another resource permission processing method according to an embodiment of this application.

The following describes the resource permission processing method provided in the embodiments of this application by using an example in which a Linux operating system is installed on a terminal device and the terminal device downloads a system software version upgrade package by using an OTA technology. FIG. 4A is a schematic flowchart of a still another resource permission processing method according to an embodiment of this application. As shown in FIG. 4A, in a recovery phase, after a terminal device downloads a system software version upgrade package by using an OTA technology, the method may include:

S301: Before the system software version upgrade package is parsed, obtain a third resource permission configuration file stored in the terminal device.

S302: When the system software version upgrade package is parsed, obtain a second resource permission configuration file carried in the system software version upgrade package.

S303: Compare the second resource permission configuration file with the third resource permission configuration file, compare a label corresponding to each piece of path information in the second resource permission configuration file with a label corresponding to each piece of path information in the third resource permission configuration file, and use path information with different labels as first path information.

S304: Generate a first resource permission configuration file based on each piece of first path information and a label corresponding to each piece of first path information in the second resource permission configuration file.

S305: Encrypt and sign the first resource permission configuration file.

S306: Store the first resource permission configuration file.

After operation S306 is performed, the terminal device is restarted, and enters an init phase.

Figure 4B:
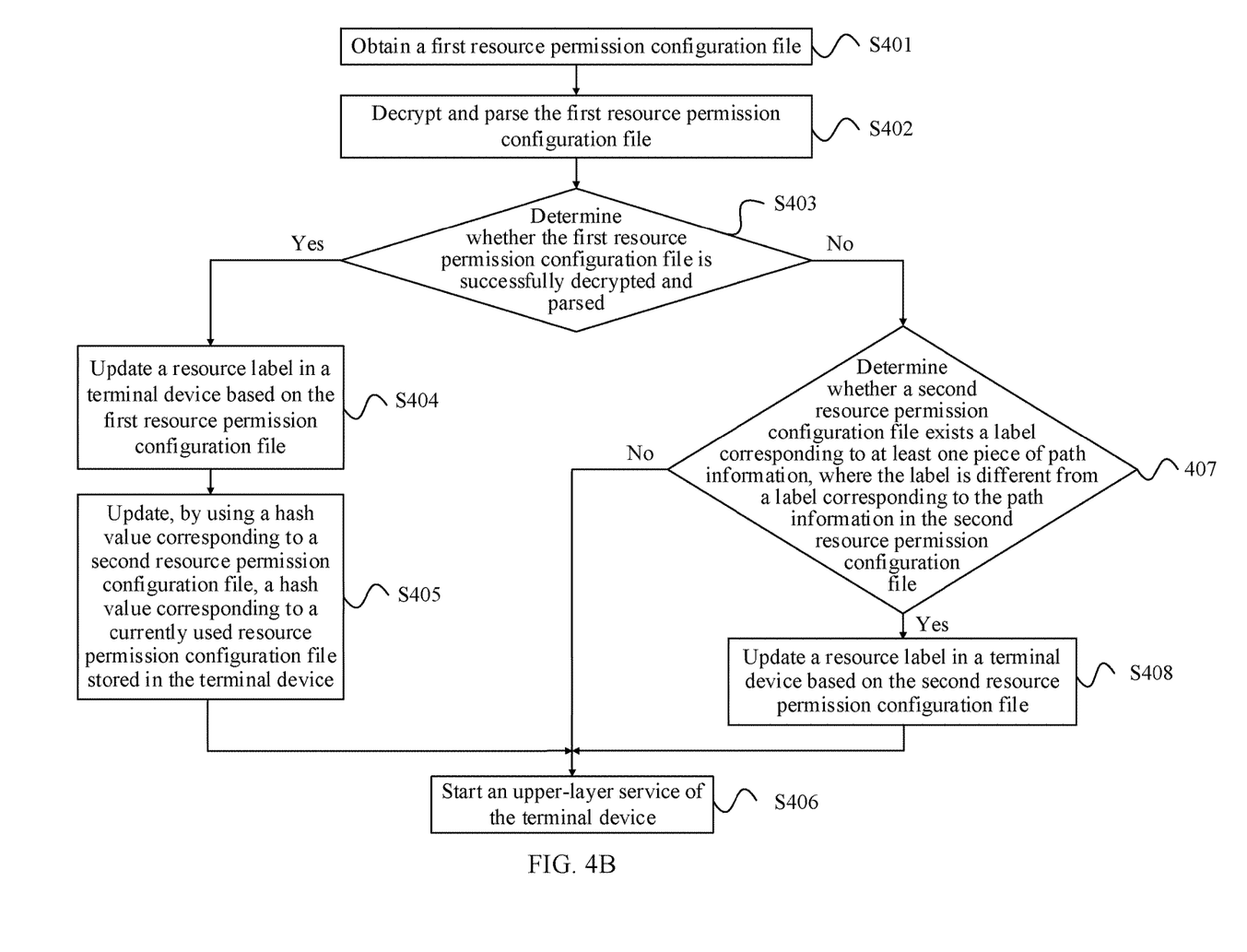
FIG. 4B is a schematic flowchart of a still another resource permission processing method according to an embodiment of this application.

FIG. 4B is a schematic flowchart of a still another resource permission processing method according to an embodiment of this application. As shown in FIG. 4B, after the init phase is entered, the method may include the following operations.

S401: Obtain a first resource permission configuration file.

S402: Decrypt and parse the first resource permission configuration file.

S403: Determine whether the first resource permission configuration file is successfully decrypted and parsed, and if yes, perform S404, or if no, perform S407.

S404: Update a resource label in a terminal device based on the first resource permission configuration file.

S405: Update, by using a hash value corresponding to a second resource permission configuration file, a hash value corresponding to a currently used resource permission configuration file stored in the terminal device.

As described in the foregoing embodiment, a resource permission configuration file corresponds to a hash value, and the hash value is generated based on content of the resource permission configuration file. In the prior art, a terminal device installed with a Linux operating system stores the hash value corresponding to the currently used resource permission configuration file. Therefore, in this embodiment, the terminal device installed with the Linux operating system updates, in the foregoing manner, the resource label stored in the terminal device. In other words, the currently used resource permission configuration file in the terminal device should be the second resource permission configuration file rather than a third resource permission configuration file. The terminal device may further update, by using the hash value corresponding to the second resource permission configuration file, the hash value corresponding to the currently used resource permission configuration file stored in the terminal device. In other words, the hash value corresponding to the third resource permission configuration file stored in the terminal device is replaced. This manner may ensure accuracy of the hash value that is stored in the terminal device and that is used to represent the currently used resource permission configuration file.

S406: Start an upper-layer service of the terminal device.

After operation S406 is performed, an execution process of this system software version upgrade is completed.

S407: Determine whether a second resource permission configuration file exists a label corresponding to at least one piece of path information, where the label is different from a label corresponding to the path information in the second resource permission configuration file. If yes, perform S407; or if no, return to perform S406.

S408: Update a resource label in a terminal device based on the second resource permission configuration file.

After operation S408 is performed, return to perform S406.

Optionally, in a process of performing the foregoing operation, the terminal device may monitor in real time that duration for updating the resource label exceeds preset duration. If yes, the terminal device may restart the terminal device, to re-execute the procedure shown in FIG. 4B. This manner may ensure reliability of updating the resource label and further improve reliability of upgrading the system software version.

According to the method provided in this embodiment of this application, the first resource permission configuration file is generated based on the resource permission configuration files used before and after the system software is upgraded. In this way, the first resource permission configuration file covers only path information in which labels are changed. Therefore, when the terminal device updates, based on the first resource permission configuration file, the resource label stored in the terminal device, the matching amount is reduced when the terminal device searches the first resource permission configuration file for the path information that matches the traversal path information of the resource, the time consumed for labeling the stored resource can be reduced. This further improves the labeling efficiency, reduces the time consumed for the system software version upgrade, and improves the efficiency of the system software version upgrade.

User's use habits are different. Therefore, even for terminal devices of a same type, quantities of resources in the terminal devices of different users are different, fragmented levels of storage component are different, and label content is also different. Therefore, when the terminal devices of the different users label stored resources in a prior-art manner, time consumed is also different. Consequently, the users who use the terminal devices of the same type have different user experience for the system software upgrade. For example, 50 seconds is required for labeling by using a terminal device used for more than half a year, and more time than a preset maximum power-on duration in a system is required for labeling by using some terminal devices. Consequently, the terminal device is repeatedly restarted to re-upgrade the system software version. However, according to the method provided in this embodiment of this application, the matching amount is greatly reduced when the terminal device searches the first resource permission configuration file for the path information that matches the traversal path information of the resource. Even if the user's use habits are different, time consumed for upgrading same system software versions in terminal devices of the same type is approximately the same. This improves user experience.

Figure 5:
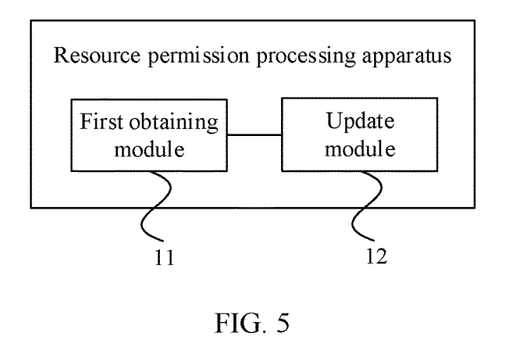
FIG. 5 is a schematic structural diagram of a resource permission processing apparatus according to an embodiment of this application.

FIG. 5 is a schematic structural diagram of a resource permission processing apparatus according to an embodiment of this application. The resource permission processing apparatus may be a terminal device, or may be a chip applicable to a terminal device. As shown in FIG. 5, the apparatus may include a first obtaining module 11 and an update module 12, where the first obtaining module 11 is configured to: when a system software version in the terminal device is upgraded, obtain a first resource permission configuration file, where the first resource permission configuration file includes at least one piece of first path information and a label corresponding to the at least one piece of first path information in a second resource permission configuration file, the second resource permission configuration file is a resource permission configuration file corresponding to a new system software version, a third resource permission configuration file is a resource permission configuration file corresponding to an earlier system software version, and the first path information is path information, same as path information that is corresponding to different labels and that is in the second resource permission configuration file and the third resource permission configuration file; and the update module 12 is configured to update a resource label in the terminal device based on the first resource permission configuration file.

Optionally, in some embodiments, the update module 12 is configured to: when the first path information includes a regular expression character, update all resource labels in an upper-level path of the first path based on the label corresponding to the first path information in the second resource permission configuration file. In some other embodiments, the update module 12 is configured to: when the first path information includes a regular expression character string in a preset format, update all resource labels in the first path based on the label corresponding to the first path information in the second resource permission configuration file.

Optionally, in some embodiments, the update module 12 is further configured to: when the first obtaining module 11 fails to obtain the first resource permission configuration file, update the resource label in the terminal device based on the second resource permission configuration file.

When an operating system of the terminal device is a Linux operating system, and the update module 12 is further configured to after an operation of updating the resource label in the terminal device is completed, update, by using a hash value corresponding to the second resource permission configuration file, a hash value corresponding to a currently used resource permission configuration file stored in the terminal device.

Figure 6:
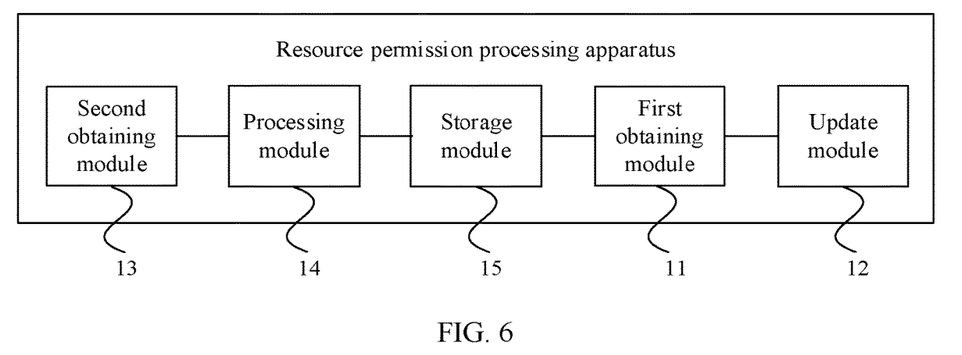
FIG. 6 is a schematic structural diagram of another resource permission processing apparatus according to an embodiment of this application.

FIG. 6 is a schematic structural diagram of another resource permission processing apparatus according to an embodiment of this application. As shown in FIG. 6, based on the block diagram shown in FIG. 5, the apparatus may further include:

a second obtaining module 13, configured to: before the first obtaining module 11 obtains the first resource permission configuration file, obtain the second resource permission configuration file and the third resource permission configuration file; for example, the second obtaining module 13 is configured to: before a system software version upgrade package is parsed, obtain the third resource permission configuration file stored in the terminal device; and when the system software version upgrade package is parsed, obtain the second resource permission configuration file carried in the system software version upgrade package.

a processing module 14, configured to: compare a label corresponding to each piece of path information in the second resource permission configuration file with a label corresponding to each piece of path information in the third resource permission configuration file, use path information with different labels as the first path information, and generate the first resource permission configuration file based on each piece of the first path information and a label corresponding to each piece of the first path information in the second resource permission configuration file; and a storage module 15, configured to store the first resource permission configuration file.

Optionally, in some embodiments, the processing module 14 is further configured to encrypt and sign the first resource permission configuration file before the storage module 15 stores the first resource permission configuration file.

Figure 7:
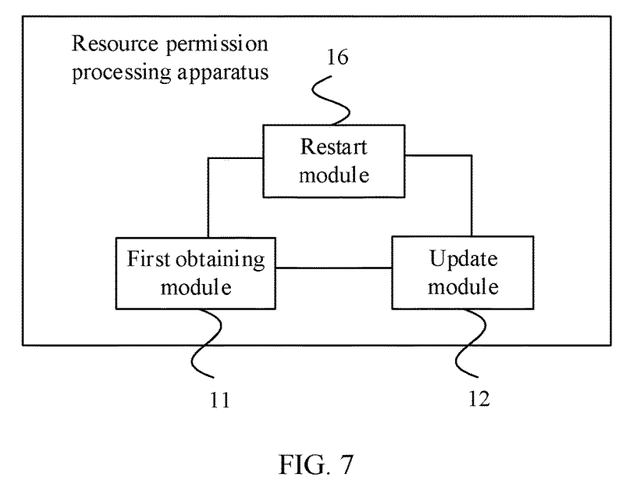
FIG. 7 is a schematic structural diagram of a still another resource permission processing apparatus according to an embodiment of this application.

FIG. 7 is a schematic structural diagram of a still another resource permission processing apparatus according to an embodiment of this application. As shown in FIG. 7, based on the block diagram shown in FIG. 5, the apparatus may further include:

a restart module 16, configured to restart the terminal device when duration in which the update module 12 updates the resource label in the terminal device exceeds preset duration; where the first obtaining module 11 is further configured to re-obtain the first resource permission configuration file.

The resource permission processing apparatus provided in this embodiment of this application may perform an action performed by the terminal device in the foregoing method embodiments. Implementation principles and technical effects thereof are similar, and details are not described herein again.

It should be noted that, the foregoing modules may be implemented in a form of software invoked by a processing element, or may be implemented in a form of hardware. For example, the processing module may be a processing element separately disposed, or may be integrated into a chip of the foregoing apparatus for implementation. In addition, the processing module may be stored in a memory of the foregoing apparatus in a form of program code, and is invoked by a processing element of the foregoing apparatus to perform a function of the processing module. In addition, all or some of the modules may be integrated together, or may be implemented separately. The processing element may be an integrated circuit and has a signal processing capability. In an implementation process, operations in the methods or the modules can be implemented by using a hardware integrated logical circuit in the processing element, or by using instructions in a form of software.

For example, the modules may be configured as one or more integrated circuits for implementing the method, such as one or more application-specific integrated circuits ( ), one or more microprocessors (DSP), or one or more field programmable gate arrays (FPGA). For another example, when one of the modules is implemented by invoking program code by a processing element, the processing element may be a general purpose processor, such as a central processing unit (CPU), or another processor that can invoke the program code. For another example, the modules may be integrated together, and implemented in a form of a system-on-a-chip ( ).

Figure 8:
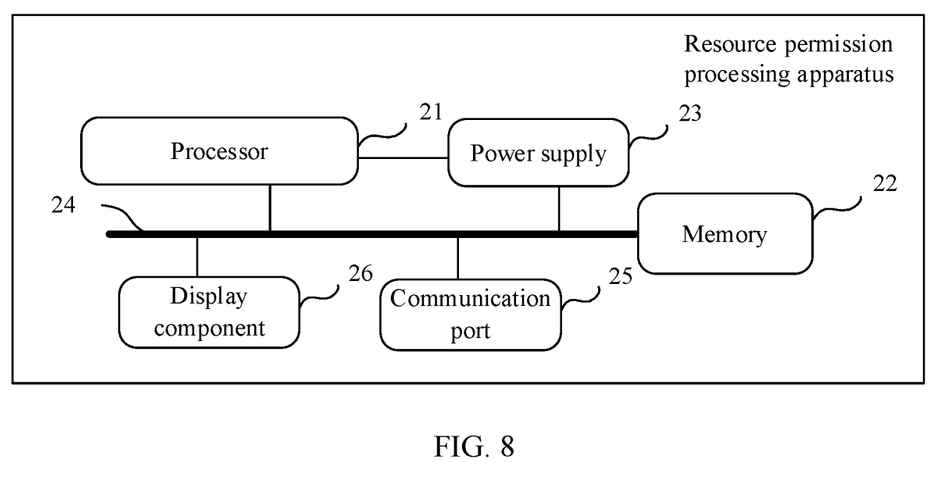
FIG. 8 is a schematic structural diagram of a still another resource permission processing apparatus according to an embodiment of this application.

FIG. 8 is a schematic structural diagram of a still another resource permission processing apparatus according to an embodiment of this application. As shown in FIG. 8, the apparatus may include a processor 21 (for example, a CPU) and a memory 22. The memory 22 may include a high-speed random access memory (RAM), or may further include a non-volatile memory (non-volatile memory, NVM), for example, at least one magnetic disk storage. The memory 22 may store various instructions, to complete various processing functions and implement method operations of this application. Optionally, the apparatus in this application may further include a power supply 23, a communications bus 24, a communication port 25, and a display component 26. The communications bus 24 is configured to implement a communication connection between elements. The communication port 25 is configured to implement a connection and communication between the resource permission processing apparatus and another peripheral. The display component 26 is configured to provide, during a system software version is upgraded, a user with information, an animation, or the like related to the system software version upgrade. For example, the display unit may display user reminder information in a process in which a terminal device labels a resource, for example, one or more pieces of information of a labeling progress, a currently being labeled resource, a resource label, or the like.

In this embodiment of this application, the memory 22 is configured to store computer-executable program code, and the program code includes an instruction. When the processor 21 executes the instruction, the instruction enables the processor 21 of the resource permission processing apparatus to perform a processing action of the terminal device in the foregoing method embodiment. Implementation principles and technical effects thereof are similar, and details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In this specification, "a plurality of" means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects, and the character "/" in a formula represents a "division" relationship between the associated objects.

It may be understood that numbers in the embodiments of this application are merely for differentiation for ease of description, and are not intended to limit the scope of the embodiments of this application.

It may be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A resource permission processing method, comprising:
   when a system software version in a terminal device is upgraded, obtaining a first resource permission configuration file, wherein the first resource permission configuration file comprises at least one piece of first path information and a label corresponding to the at least one piece of the first path information in a second resource permission configuration file, the second resource permission configuration file corresponding to a new system software version, and the label corresponding to the first path information in the second resource permission configuration file is different from a previous label corresponding to the first path information in a third resource permission configuration file that corresponds to an earlier system software version; and
   updating a resource label in the terminal device based on the first resource permission configuration file.

2. The method according to claim 1, wherein before the obtaining the first resource permission configuration file, the method further comprises:
   obtaining the second resource permission configuration file and the third resource permission configuration file;
   comparing a label corresponding to each piece of path information in the second resource permission configuration file with a label corresponding to each piece of the path information in the third resource permission configuration file, and using the path information with different labels as the first path information;
   generating the first resource permission configuration file based on each piece of the first path information and a label corresponding to each piece of the first path information in the second resource permission configuration file; and
   storing the first resource permission configuration file.

3. The method according to claim 2, wherein before the storing the first resource permission configuration file, the method further comprises:
   encrypting and signing the first resource permission configuration file.

4. The method according to claim 2, wherein the obtaining the second resource permission configuration file and the third resource permission configuration file comprises:
   before a system software version upgrade package is parsed, obtaining the third resource permission configuration file stored in the terminal device; and
   when the system software version upgrade package is parsed, obtaining the second resource permission configuration file carried in the system software version upgrade package.

5. The method according to claim 1, wherein the updating the resource label in the terminal device based on the first resource permission configuration file comprises:
   when the first path information comprises a regular expression character, updating all resource labels in an upper-level path of a first path based on the label corresponding to the first path information in the second resource permission configuration file.

6. The method according to claim 1, wherein the updating the resource label in the terminal device based on the first resource permission configuration file comprises:
   when the first path information comprises a regular expression character string in a preset format, updating all resource labels in a first path based on the label corresponding to the first path information in the second resource permission configuration file.

7. The method according to claim 1, wherein the method further comprises:
   when the first resource permission configuration file fails to be obtained, updating the resource label in the terminal device based on the second resource permission configuration file.

8. The method according to claim 1, wherein the method further comprises:
   when duration for updating the resource label in the terminal device exceeds preset duration, restarting the terminal device, and re-obtaining the first resource permission configuration file.

9. The method according to claim 1, wherein an operating system of the terminal device is a Linux operating system, and the method further comprises:

after an operation of updating the resource label in the terminal device is completed, updating, by using a hash value corresponding to the second resource permission configuration file, a hash value corresponding to a currently used resource permission configuration file stored in the terminal device.

10. A resource permission processing apparatus, comprising:

a processor; and a memory coupled to the processor to store instructions, which when executed by the processor, cause the processor to:

when a system software version in a terminal device is upgraded, obtain a first resource permission configuration file, wherein the first resource permission configuration file comprises at least one piece of first path information and a label corresponding to the at least one piece of the first path information in a second resource permission configuration file, the second resource permission configuration file corresponding to a new system software version, and the label corresponding to the first path information in the second resource permission configuration file is different from a previous label corresponding to the first path information in a third resource permission configuration file that corresponds to an earlier system software version; and update a resource label in the terminal device based on the first resource permission configuration file.

11. The apparatus according to claim 10, wherein the processor is further to:

before the apparatus obtains the first resource permission configuration file, obtain the second resource permission configuration file and the third resource permission configuration file;

compare a label corresponding to each piece of path information in the second resource permission configuration file with a label corresponding to each piece of the path information in the third resource permission configuration file, use the path information with different labels as the first path information, and generate the first resource permission configuration file based on each piece of the first path information and a label corresponding to each piece of the first path information in the second resource permission configuration file; and store the first resource permission configuration file.

12. The apparatus according to claim 11, wherein the processor is further to encrypt and sign the first resource permission configuration file before the apparatus stores the first resource permission configuration file.

13. The apparatus according to claim 11, wherein the processor is to: before a system software version upgrade package is parsed, obtain the third resource permission configuration file stored in the terminal device; and when the system software version upgrade package is parsed, obtain the second resource permission configuration file carried in the system software version upgrade package.

14. The apparatus according to claim 10, wherein the processor is to: when the first path information comprises a regular expression character, update all resource labels in an upper-level path of a first path based on the label corresponding to the first path information in the second resource permission configuration file.

15. The apparatus according to claim 10, wherein the processor is to: when the first path information comprises a regular expression character string in a preset format, update all resource labels in a first path based on the label corresponding to the first path information in the second resource permission configuration file.

16. The apparatus according to claim 10, wherein the processor is further to: when the apparatus fails to obtain the first resource permission configuration file, update the resource label in the terminal device based on the second resource permission configuration file.

17. The apparatus according to claim 10, wherein the processor is further to:

restart the terminal device when duration in which the apparatus updates the resource label in the terminal device exceeds preset duration, wherein the processor is further to re-obtain the first resource permission configuration file.

18. The apparatus according to claim 10, wherein an operating system of the terminal device is a Linux operating system, and the processor is further to: after an operation of updating the resource label in the terminal device is completed, update, by using a hash value corresponding to the second resource permission configuration file, a hash value corresponding to a currently used resource permission configuration file stored in the terminal device.

19. A non-transitory machine-readable storage medium having instructions stored therein, which when executed by a processor, cause the processor to perform operations, the operations comprising:

when a system software version in a terminal device is upgraded, obtaining a first resource permission configuration file, wherein the first resource permission configuration file comprises at least one piece of first path information and a label corresponding to the at least one piece of the first path information in a second resource permission configuration file, the second resource permission configuration file corresponding to a new system software version, and the label corresponding to the first path information in the second resource permission configuration file is different from a previous label corresponding to the first path information in a third resource permission configuration file that corresponds to an earlier system software version; and updating a resource label in the terminal device based on the first resource permission configuration file.

20. The non-transitory machine-readable storage medium according to claim 19, wherein the operations further comprises:

obtaining the second resource permission configuration file and the third resource permission configuration file;

comparing a label corresponding to each piece of path information in the second resource permission configuration file with a label corresponding to each piece of the path information in the third resource permission configuration file, and using the path information with different labels as the first path information;

generating the first resource permission configuration file based on each piece of the first path information and a label corresponding to each piece of the first path information in the second resource permission configuration file; and storing the first resource permission configuration file.

* * * * *